United States Patent [19]

Edwards

[11] Patent Number: 5,602,466
[45] Date of Patent: Feb. 11, 1997

[54] DUAL OUTPUT TEMPERATURE COMPENSATED VOLTAGE REFERENCE

[75] Inventor: Arthur J. Edwards, Hoffman Estates, Ill.

[73] Assignee: Motorola Inc., Schaumberg, Ill.

[21] Appl. No.: 200,021

[22] Filed: Feb. 22, 1994

[51] Int. Cl.⁶ .................................................. G05F 3/16
[52] U.S. Cl. ...................................... 323/313; 323/907
[58] Field of Search ........................... 323/313, 314, 323/907, 281; 327/538, 539

[56] References Cited

U.S. PATENT DOCUMENTS

| | | | |
|---|---|---|---|
| 4,325,018 | 4/1982 | Schade, Jr. | 323/313 |
| 4,447,784 | 5/1984 | Dobkin | 323/226 |
| 4,525,663 | 6/1985 | Henry | 323/280 |
| 4,626,770 | 12/1986 | Price, Jr. | 323/313 |
| 4,628,248 | 12/1986 | Birrittella et al. | 323/314 |
| 5,087,831 | 2/1992 | Ten Eyck | 307/296.6 |
| 5,160,882 | 11/1992 | Ten Eyck | 323/314 |
| 5,168,210 | 12/1992 | Thus | 323/313 |
| 5,208,527 | 5/1993 | Poletto et al. | 323/13 |
| 5,241,261 | 8/1993 | Edwards et al. | 323/313 |

*Primary Examiner*—Peter S. Wong
*Assistant Examiner*—Adolf Berhane
*Attorney, Agent, or Firm*—Nicholas C. Hopman

[57] ABSTRACT

A dual output temperature compensated voltage reference includes a voltage reference circuit (201) having a first output (203) for providing a first signal (204) dependent on temperature, and a second output (207) for providing a second signal (208) dependent on the first signal (204). A temperature dependence of the first signal (204) has a slope opposite a temperature dependence of the second signal (208). A cooperative device (209), such as a resistive divider (309, 311), combines the first and second signals (204, 208) and provides a third signal (212) dependent on the first and second signals (204, 208). Preferably, this apparatus is applied in a charge regulator including fault detection (109). The charge regulator (109) generates a charge voltage (110) dependent on the first signal (204) and a fault detection function is dependent on the third signal (212).

2 Claims, 2 Drawing Sheets

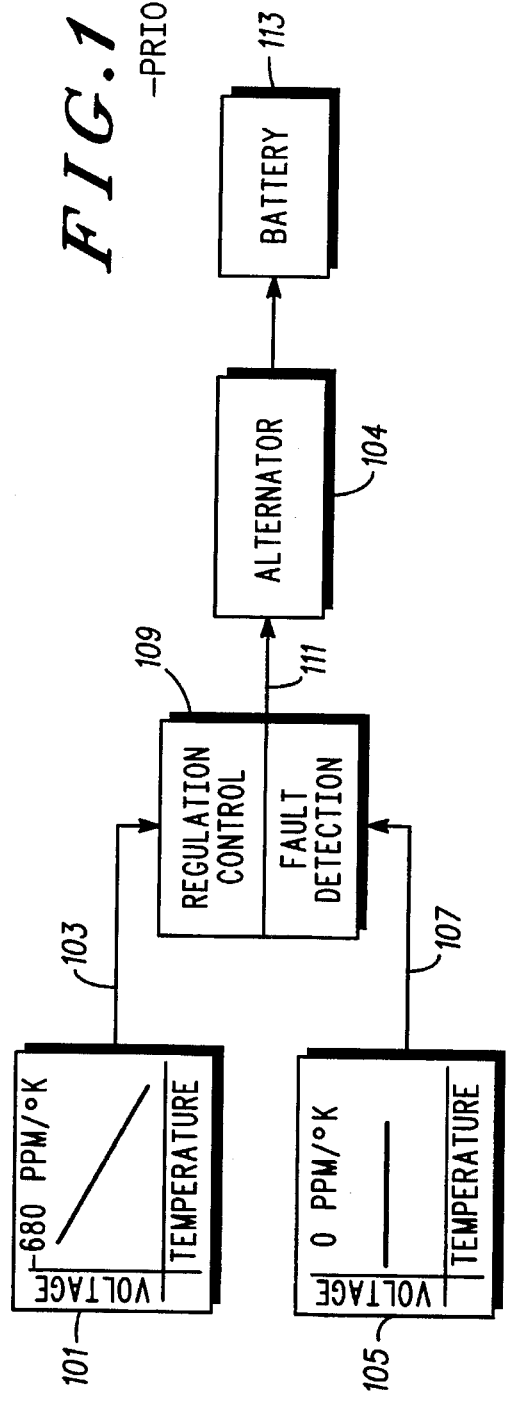
FIG.1 —PRIOR ART—
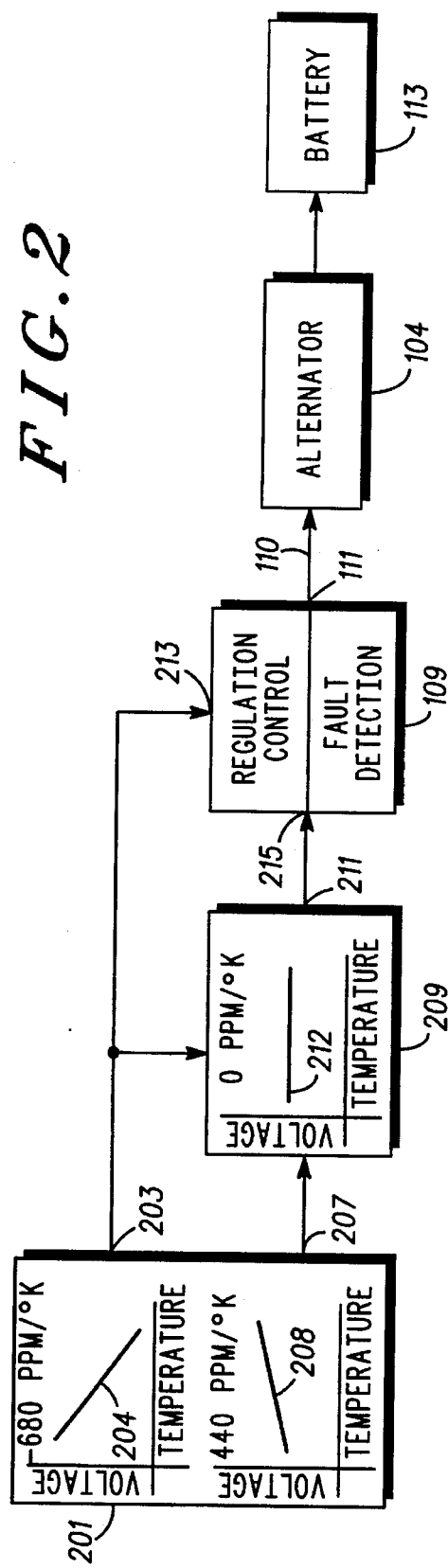
FIG.2

5,602,466

DUAL OUTPUT TEMPERATURE COMPENSATED VOLTAGE REFERENCE

FIELD OF THE INVENTION

This invention is generally directed to the field of temperature dependent voltage sources. These temperature dependent voltage sources may be useful when applied in vehicular alternator system voltage regulators.

BACKGROUND OF THE INVENTION

In contemporary vehicular alternator system voltage regulators, it is commonplace to use temperature dependent voltage sources to synthesize battery charge profiles. These temperature dependent charge profiles are necessary, because these systems are used to charge batteries that can be most efficiently charged at different rates depending on ambient temperature proximate the battery. For instance, some of these systems rely on generation of reference signals that have substantially different temperature coefficients that are used to determine thresholds used in regulation and fault detection operations.

Prior art systems accomplish this requirement by independently synthesizing two temperature dependent reference signals, or voltages. These voltages are used independently or in combination to synthesize the appropriate charging and fault detection profiles, and associated thresholds, for the battery under charge. In FIG. 1 a typical prior art block diagram is illustrated. A temperature dependent voltage source 101 has an output 103 for providing a voltage having a temperature dependence of −680 ppm/°K. (parts per million/degree Kelvin) which is equivalent to −10 mV/°K., (millivolts/degree Kelvin) which is typical in a 12 volt battery charging system. Also, a second voltage source 105 provides an output 107 for generating a temperature independent voltage—here 0 ppm/°K., or 0 mV/°K. The outputs 103 and 107 are supplied to a charge regulator 109 which in turn controls an alternator 104 to generate a temperature dependent voltage to a battery 113. The temperature dependent voltage provides a charge profile dependent on the voltage provided at the output 103. Also the charge regulator 109 has a fault detection function dependent on the voltage provided at the output 107.

Typically, two bandgap voltage sources are used to construct these temperature predictable voltage sources. This is the cause of several problems. First, since there are two complete bandgap reference circuits, the size; complexity; and cost of the combined circuits is unnecessarily high. Secondarily, because these voltage sources 101 and 105 operate independently, the charge regulator 109 cannot expect the outputs 103 and 107 of the two voltage sources 101 and 105 to be accurately related over temperature. This is problematic because the charge regulator 109 requires that the outputs 103 and 107 of the two voltage sources 101 and 105 be closely related, in order to minimize the error of the desired charge profile and associated thresholds. If the outputs 103 and 107 of the two voltage sources 101 and 105 are not correlated, then the charge regulator 109 must be at least as inaccurate as the independence between the two voltage sources 101 and 105.

Furthermore, to improve any correlation between the two voltage sources 101 and 105, active trimming of critical components is required. This is process intensive and expensive to perform in a manufacturing environment. At a minimum, this dual active trimming process adds unnecessary circuit area and test time.

What is needed is an improved dual output temperature compensated voltage reference, that has a known voltage relationship over temperature between its dual outputs, is simpler, more accurate, more compact in size, lower in cost, and is more manufacturable.

BRIEF DESCRIPTION OF THE DRAWINGS

FIG. 1 is a block diagram illustrating a typical prior art charging regulation system including a dual temperature compensated voltage reference;

FIG. 2 is a block diagram is an embodiment in accordance with certain inventive aspects of the disclosed invention;

DETAILED DESCRIPTION OF A PREFERRED EMBODIMENT

Figure 3:
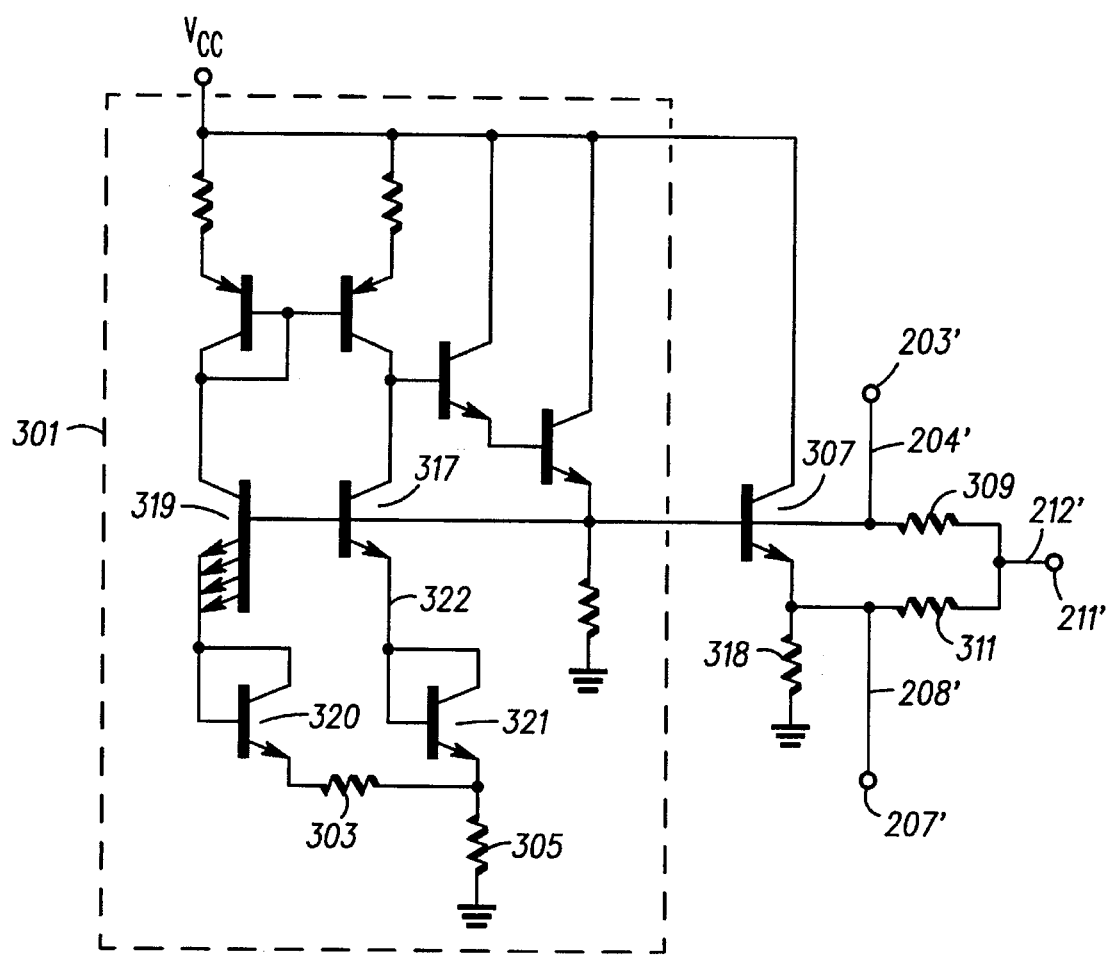
FIG. 3 is a schematic diagram illustrating details of a constituent part of the embodiment shown in FIG. 2.

A dual output temperature compensated voltage reference that overcomes the deficiencies of the prior art includes a singular voltage reference circuit. The voltage reference circuit has a first output for providing a first signal dependent on temperature, and also a second output for providing a second signal dependent on the first signal. A temperature dependence of the first signal has a slope opposite a temperature dependence of the second signal. A cooperative device, such as a resistive divider, combines the first and second signals and provides a third signal dependent on the first and second signals. Preferably, this apparatus is applied in a charge regulator including fault detection. The charge regulator generates a charge voltage dependent on the first signal, and a fault detection function is dependent on the third signal. Next, details of the apparatus will be introduced in block diagram form.

FIG. 2 is a block diagram illustrating certain inventive details of the disclosed apparatus. A voltage reference means 201, preferably a bandgap reference circuit, has a first output 203 that provides a first signal 204 dependent on temperature, and a second output 207 for providing a second signal 208 dependent on the first signal 204 and has a different temperature dependence than the first signal 204. A cooperative means 209 is coupled to the first and second outputs 203 and 207 of the bandgap reference circuit 201. The cooperative means 209 combines the first and second signals 204 and 208 and provides third signal 212 at a third output 211. The third signal 212 is dependent on the first and second signals 204 and 208. The purpose of the cooperative means 209 is to derive a third signal that is independent of temperature but dependent on the signals 204 and 208.

Next, a charge regulator with fault detection 109 includes a first input 213, a second input 215 and an output 111. The first input 213 is coupled to the first output 203 of the bandgap reference circuit 201, and the second input 215 is coupled to the third output 211 of the cooperative means 209. The output 111 of the charge regulator with fault detection 109 generates a charge voltage 110 dependent on the first signal 204, and fault detection is dependent on the third signal 212.

The first signal 204 has a negative temperature coefficient because a standard automotive lead-acid battery requires a charging voltage which is higher at low temperatures and lower at high temperatures. Typically, this slope is chosen by the automobile manufacturer to be between −0 mV/°K. (0 ppm/°K.) and −12 mV/°K. (−800 ppm/°K.) for a 12 V battery system. The slope of the second signal 208 is chosen such that it is possible to combine the first and second signals 204 and 208 to produce the third signal 212 which has a zero temperature coefficient. The third signal 212 has a zero temperature coefficient because some failure detection thresholds are required by application to be the same at all temperatures. Of course other slopes are achievable if desired.

The charge regulator 109 uses the first signal 204 to control a charging voltage to the battery 113 as a function of the charge regulator's 109 temperature. The charge regulator 109 also uses the third signal 212 to set thresholds for fault detection in the charge regulator 109. An important feature of the charging voltage and the fault detection thresholds in an automotive charging system is that they both need to be highly accurate, and for manufacturing reasons they should not both have to be adjusted.

In the preferred embodiment, the third signal 212 is derived from, and predictably tracks, the first signal 204. Any initial errors in the first signal 204 may be removed by a simple trim process in manufacturing. This will set the charge regulator's 109 regulation voltage to a high precision, so the remaining, dynamic, error in the relationship between the first signal 204 and the third signal 212 is insignificantly small. Next, a circuit schematic diagram will be used to further detail the above-described apparatus.

FIG. 3 is a schematic diagram illustrating details of a constituent part of the embodiment shown in FIG. 2. A circuit shown in FIG. 3 may be conveniently manufactured on an integrated circuit or fabricated on a hybrid circuit substrate. The circuit contained within the dashed box associated with reference number 301 is a typical bandgap voltage reference circuit. In operation, an output voltage, representing the above-mentioned first signal—here 204' is produced at an output 203'. Note that the prime (') notation adopted in this disclosure simply indicates another occurrence of the same reference number in another figure that illustrates more detail. For instance, the first signal 204 illustrated in FIG. 2 is synonymous with the first signal 204' in FIG. 3. The first signal 204' is thermally dependent. A magnitude vs. temperature, or slope, of this first signal 204' is set by a ratio of resistors 303 and 305, the ratio of emitter junctions of transistors 319, and 317, and transistors 320 and 321.

Another signal 322 is related to the first signal 204' through the operation of the bandgap reference circuit 301. This signal 322 is used to derive the second signal 208 shown in FIG. 2, or 208' here in FIG. 3. Because the signal 322 is derived from an emitter of transistor 317 and the first signal 204' is derived from the base of transistor 317, and the transistor's base-emitter junction has a negative temperature coefficient, the signal 322 will have a positive slope. Because a direct connection to the signal 322 by the cooperative means 209 would cause the bandgap operation to be affected, another apparatus, in this case an emitter follower circuit, must be added to the circuit. This emitter follower circuit acts to provide the second signal 208' without adversely affecting the operation of the bandgap reference circuit 301.

The emitter follower circuit includes a transistor 307 that is constructed of a same geometry as transistor 317, and also a resistor 318 which is selected to cause a same level of current conduction through transistor 307 as the emitter circuit of transistor 317. Maintaining this relationship ensures that the current density in transistors 307 and 317 are nearly identical. It is this structure that ensures that the second signal 208' is derived dependent on the first signal 204'. This structurally ensured dependency ensures that the temperature dependence of the first signal 204' and second signal 208' will be closely dependent, and in fact track. The signals 204' and 208' are offset by an base-emitter junction of transistor 307. This base-emitter junction will follow a well characterized temperature related dependency. Therefore, a second signal 208' will track the first signal 204' defined by this well characterized temperature related dependency.

The above-described cooperative means is embodied here in a resistive divider comprising resistors 309 and 311. This is a simple and low cost solution for combining the first and second signals 204' and 208' and providing the third signal 212'. Of course given the teaching here those skilled in the art will find other, equivalent, structures for combining the first and second signals 204' and 208' and for providing the third signal 212' dependent thereon. By selecting appropriate values for the resistors 309 and 311 it is possible to synthesize a signal 212' that has any temperature coefficient performance lying between the temperature coefficient performance of signals 204' and 208'. Typically, the required temperature coefficient for the third signal 212' is 0 mV/K (0 ppm/K). In this case the calculation required to determine values for the resistors corresponding to reference numbers 309 and 311 is simply one that creates a voltage divider whose mid-point is positioned proportionally between the two temperature coefficients associated with the first and second signals 204' and 208'. For example if 204' has a temperature coefficient of −680 ppm/°K. and 208' has a temperature coefficient of +440 ppm/°K., then resistor 309 has to have 680 units of resistance for every 440 units of resistance of resistor 311 to ensure a temperature coefficient of 0 mV/K (0 ppm/K).

Figure 4:
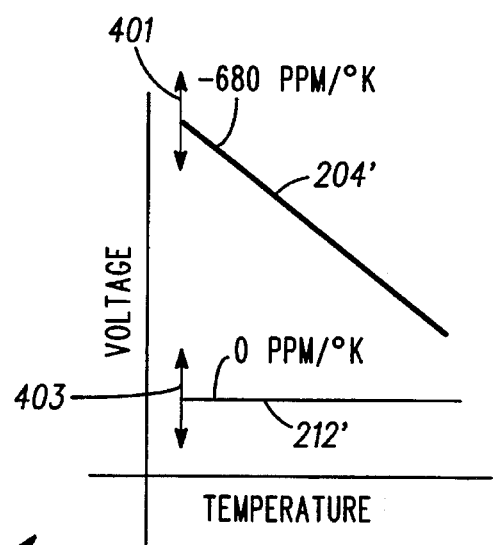
FIG. 4 is a chart illustrating the relationship between a temperature dependent and a temperature independent signal.

Next, in FIG. 4, a predetermined relationship is illustrated between a magnitude of the first signal 204' and a magnitude of the third signal 212'. As noted by the arrows associated with reference numbers 401 and 403 if the first signal 204' is shifted either up or down in magnitude then the third signal 212' will follow with a corresponding change magnitude because through structural dependence it closely tracks the first signal 204'. This offers a significant advantage over the prior art approaches. This is because prior art approaches derived these two reference signal independently—thus they did not track together. Because of this new approach a more accurate voltage regulator integrated circuit for an alternator based charging system can be constructed.

In conclusion, an improved dual output temperature compensated voltage reference has been described. This voltage reference has a known voltage relationship over temperature between its dual outputs. Also, it is simpler, more accurate, more compact in size, lower in cost, and is more manufacturable than prior art schemes.

What is claimed is:

1. A dual output temperature compensated voltage reference comprising:

bandgap reference means having a first output for providing a first signal dependent on temperature, and a second output for providing a second signal dependent on the first signal, wherein a temperature dependence of the first signal has a slope opposite a temperature dependence of the second signal, wherein said bandgap reference means includes a bandgap reference circuit and a transistor having a base terminal for receiving the first signal and an output terminal for providing the second signal, wherein the output terminal of the transistor is an emitter terminal; and cooperative means coupled to the first and second outputs of said bandgap reference means, said cooperative means for combining the first and second signals, wherein said cooperative means has a third output for providing a third signal dependent on the first and second signals, wherein the cooperative means comprise a series connected resistive divider, and wherein one end of the series connected resistive divider is coupled to the first output of said bandgap reference means and another end of the series connected resistive divider is coupled to the emitter terminal of the transistor and the third output of the cooperative means is provided at a junction of the series connected resistive divider opposite the ends.

2. A voltage regulator integrated circuit for an alternator based charging system for supplying a thermally dependent charge voltage to a battery comprising:

a bandgap reference circuit having a first output for providing a first signal dependent on temperature, and a second output for providing a second signal dependent on the first signal, wherein said bandgap reference circuit includes a transistor having a base terminal for receiving the first signal and an output terminal for providing the second signal, wherein the output terminal of the transistor is an emitter terminal, and wherein a temperature dependence of the first signal has a slope opposite a temperature dependence of the second signal; and a series connected resistive divider for combining the first and second signals wherein one end of the series connected resistive divider is coupled to the first output of said bandgap reference means and another end of the series connected resistive divider is coupled to the emitter terminal of the transistor and the third output of the series connected resistive divider is provided at a junction of the series connected resistive divider opposite the ends, wherein said series connected resistive divider has a third output for providing a third signal substantially independent of temperature, wherein the third signal is dependent on the first and second signals, and wherein a magnitude of the first signal and a magnitude of the third signal are related by a predetermined relationship; and a charge regulator with fault detection having a first input, a second input and an output, wherein the first input is coupled to the first output of said bandgap reference circuit, and the second input is coupled to the third output of said resistive divider, and wherein the output of said charge regulator generates a charge voltage dependent on the first signal and wherein the fault detection is dependent on the third signal.

* * * * *